United States Patent [19]
Breidt, Jr. et al.

[11] Patent Number: 5,209,892
[45] Date of Patent: May 11, 1993

[54] PROCESS FOR PRODUCING THERMOFORMABLE POLYPROPYLENE FILMS AND SHEETS

[75] Inventors: Peter Breidt, Jr., Webster; John R. Wagner, Jr., Rochester, both of N.Y.

[73] Assignee: Mobil Oil Coproration, Fairfax, Va.

[21] Appl. No.: 663,761

[22] Filed: Mar. 1, 1991

Related U.S. Application Data

[63] Continuation of Ser. No. 362,535, Jun. 7, 1989, abandoned.

[51] Int. Cl.$^5$ .............................................. B29C 51/04
[52] U.S. Cl. .................. 264/544; 264/210.1; 264/291; 264/294
[58] Field of Search ............. 264/210.1, 211.14, 210.7, 264/514, 292, 291, 294, 544

[56] References Cited

U.S. PATENT DOCUMENTS

| | | | |
|---|---|---|---|
| 3,859,028 | 1/1975 | Van der Gaag et al. | 405/403 |
| 3,929,953 | 12/1975 | Van der Gaag et al. | 264/292 |
| 4,101,625 | 7/1978 | Haley | 264/210.7 |
| 4,198,256 | 4/1980 | Andrews | 264/210.7 |
| 4,256,687 | 3/1981 | Yazaki et al. | 264/294 |
| 4,307,049 | 12/1981 | Winstead | 264/210.7 |
| 4,404,162 | 9/1983 | Miki | 264/514 |
| 4,415,520 | 11/1983 | Wiggins | 264/514 |
| 4,430,852 | 2/1984 | Hatcher | 264/211.14 |
| 4,496,408 | 1/1985 | Hahn | 264/549 |
| 4,666,544 | 5/1987 | Whiteside et al. | 264/292 |

FOREIGN PATENT DOCUMENTS

| | | |
|---|---|---|
| 0115917 | 8/1984 | European Pat. Off. |
| 0271078 | 6/1988 | European Pat. Off. |
| 51-75761 | 6/1976 | Japan |

OTHER PUBLICATIONS

Hackh'Chemical Dictionary, 4th ed McGraw-Hill, New York 1972, pp. 534–535.
"Modern Plastics Encyclopedia", R. Juran, Editor, McGraw-Hill Inc., 1990.
J. Arganoff, Editor, *Modern Plastics Encyclopedia*, McGraw-Hill, Inc., (1985), pp. 70–77 Aug. 27, 1990.
D. Irwin & H. J. Foster, *Modern Plastics Encyclopedia*, McGraw-Hill, Inc., (1989), pp. 301–306.
G. Crespi & L. Luciani, *Kirk–Othmer Encyclopedia of Chemical Technology*, Third Edition, John Wiley & Sons, New York, (1981), vol. 16, pp. 453–369.
D. Schulz & D. Tak, *Kirk–Othmer Encyclopedia of Chemical Technology*, Third Edition, John Wiley & Sons, New York (1979), vol. 6, pp. 798–818.
Z. Tadmar & G. Gogos, *Principles of Polymer Processing*, John Wiley & Sons, New York, (1979), pp. 7–11, 624–631, 637–641.
W. Park & J. Conrad, *Extrusion and Other Plastics Operations*, John Wiley & Sons, (1971), pp. 103–135.

*Primary Examiner*—Willard Hoag
*Attorney, Agent, or Firm*—Alexander J. McKillop; George W. Hager, Jr.; Michael J. Mlotkowski

[57] ABSTRACT

A process for thermoforming thermo-plastics including a random copolymer of polypropylene and polyethylene. The process including stretching in at least one direction, a film or sheet containing polypropylene and polyethylene random copolymer to partially orient the sheet sufficiently as to reduce sag during thermoforming and thermoforming the stretched sheet.

19 Claims, No Drawings

PROCESS FOR PRODUCING THERMOFORMABLE POLYPROPYLENE FILMS AND SHEETS

This is a continuation of copending application Ser. No. 362,535, filed on Jun. 7, 1989 now abandoned.

FIELD OF THE INVENTION

The present invention relates to a process for producing a thermoformable polypropylene film or sheet.

BACKGROUND OF THE INVENTION

Polypropylene possesses several highly desirable properties such as low specific gravity, high heat resistance, good chemical resistance, excellent impact resistance and high stiffness. Because of these desirable properties, polypropylene homopolymers and copolymers find extensive use in industry, with homopolymers being used in approximately 80% of all applications. Homopolymers are generally produced having melt flow rates (MFR) ranging from less than 1 to greater than 100, with lower MFR grades used for sheet, film and general purpose extrusion and the higher MFR grades finding utility in injection molding and fine denier fabrics. Random copolymers are produced by introducing small amounts of ethylene, normally about one to seven percent by weight, into the polymerization reaction. The product of the well-known random copolymerization process exhibits improved clarity and toughness, with stiffness reduced somewhat over the pure homopolymer.

About one-half of all polypropylene produced is processed via extrusion techniques, with the manufacture of fiber and filament as slit film, monofilament and multifilament being among the higher volume applications. Polypropylene homopolymers and copolymers can also be extruded into sheet or film form, with MFR's below three commonly employed. However, these resin sheets and films have hardly been used on a commercial scale for thermoforming due to problems encountered when attempting to thermoform such films and sheets. As noted at page 72 of the *Modern Plastics Encyclopedia*, J. Arganoff, Editor, McGraw-Hill Inc., 1985: "Sheet applications have traditionally been limited by poor melt strength, which makes [polypropylene] difficult to thermoform using conventional techniques." The poor melt strength characteristic of polypropylene causes the sheets and films made therefrom to sag when heated during the thermoforming operation.

To address the problems associated with thermoforming polypropylene, costly high melt strength polypropylene resins have been developed specifically for thermoforming applications. Also, the recent development of modified thermoforming processes, such as the Shell-developed solid-phase pressure-forming process (SPPF) which operates below the melting point of polypropylene, or the differential pressure forming method of U.S. Pat. No. 4,666,544, has increased the use of polypropylene in thermoforming.

Japanese Patent Publication No. 14575/74 provides another proposal for the use of polypropylene in thermo-forming. This reference discloses a process for the heat molding of crystalline polyolefin resins in solid form at a temperature lower than their melting point for the purpose of improving the transparency of the products so produced. This process is said to be particularly effective in heat molding polypropylene; however, a lowered effectiveness is exhibited when the products are prepared by molding comparatively high molecular weight resins having an MFR of four or less. Thus, to eliminate such a disadvantage, it is necessary to use resins which have a high MFR and are therefore very disadvantageous in the area of impact resistance. The use of a thermoforming temperature lower than the melting point of polypropylene, while certainly better than the use of a thermoforming temperature higher than the melting point, will not, in and of itself, thoroughly eliminate such sagging.

Still another attempt to eliminate the sagging of resin sheets at the time of thermoforming is disclosed in Japanese Patent Publication No. 75761/76. In this invention, a polypropylene sheet is laminated onto a sagging-free sheet of a resin different from polypropylene in attempts to solve the problem of sagging; however, this may be unsuitable for general use since it raises problems as to lamination means, selection of resins used and the like.

Despite these developments, it would be highly desirable, especially from an economic standpoint to utilize conventional polypropylene resins to form films and sheets which are thermoformable using conventional thermoforming processes. Therefore, what is needed is a process for producing a polypropylene film or sheet which may be thermoformed using conventional techniques and equipment.

SUMMARY OF THE INVENTION

According to the present invention, there is provided a process for producing a thermoformable polypropylene film or sheet, comprising the steps of providing a polypropylene film or sheet, said polypropylene selected from the group consisting of homopolymers of propylene, copolymers of propylene and ethylene and mixtures thereof; and, stretching the film or sheet in at least one direction to obtain a partial orientation of a degree effective to minimize sag when thermoforming the film or sheet. A method of thermoforming polypropylene film or sheet is also provided.

It is therefore an object of the present invention to provide thermoformable films and sheets of polypropylene.

It is another object of the present invention to provide polypropylene films and sheets which may be thermoformed using conventional thermoforming techniques and equipment.

It is yet another object of the present invention to provide thermoformable polypropylene films and sheets produced using conventional resins.

It is still another object of the present invention to provide economical thermoformable polypropylene films and sheets.

It is still yet another object of the present invention to provide a process for thermoforming polypropylene.

Other objects aspects and the several advantages of the present invention will become apparent to those skilled in the art upon a reading of the specification and the claims appended thereto.

DETAILED DESCRIPTION OF THE INVENTION

It is known that polypropylene is difficult to thermoform using conventional techniques because of the tendency of the unsupported sheet to sag when heated. The conventional thermoforming techniques benefited by the present invention include those commonly known as straight vacuum forming; drape forming;

matched mold forming; plug assist forming; pressure bubble-plug assist vacuum forming; vacuum snapback; pressure bubble vacuum snapback; trapped sheet, contact heat, pressure forming; air-slip forming; and, any other such technique wherein a heated, film or sheet is utilized. Thermoforming systems using either cut sheet or continuous web material are both within the scope of the present invention. Details of the aforementioned thermoforming techniques are given by D. Irwin, in "Thermoforming," *Modern Plastics Encyclopedia*, McGraw-Hill Inc., 1989, pps. 301-304, which is hereby incorporated by reference it its entirety.

It is to be understood that thermoforming processes specifically designed for polypropylene film or sheet thermoforming, such as the process known to those skilled in the art as solid-phase pressure-forming (SPPF), is not to be considered a conventional thermoforming process for purposes herein. However, it is clear that such non-conventional processes as the SPPF process may be improved by the process of the present invention and, as such should not be excluded from the list of thermoforming methods benefitted by the present invention. The SPPF process is described in detail in H. J. Foster, "Solid Phase Pressure Forming," *Modern Plastics Encyclopedia*, McGraw-Hill Inc., 1989, pps 304-306.

Any polypropylene resin capable of being formed into a film or sheet is envisioned as benefitting from the process of the present invention. It is to be understood for the purposes of this patent application that, consistent with industry usage, the use of the term "film" refers to a formed material having a gauge thickness of less than or equal to 10 mils, whereas the use of the term "sheet" refers to such a material having a gauge thickness of greater than 10 mils, the forming of which is accomplished by blown-film extrusion, roll-cast extrusion and the like. Preferred resins include homopolymers of propylene and copolymers of propylene wherein the major comonomer constituent is propylene. Particularly preferred are the random copolymers of propylene and ethylene wherein the ethylene comonomer content comprises less that 10 weight percent of the overall copolymer. Still more preferred are the random copolymers of propylene wherein the ethylene comonomer comprises 0.1 to 7.0 weight percent of the copolymer.

Propylene homopolymer is a well-known, commercially available polymer obtained by the stereoregular polymerization of propylene based on the use of Ziegler-Natta catalysts. Such catalysts generally are the reaction product of an organometallic compound belonging to Groups IA to IIIA with a compound of a transition metal of Groups IVB to VIII. Propylene homopolymer and the preparation thereof are described in greater detail by G. Crespi and L. Luciani in "Olefin Polymers (Polypropylene)," *Kirk-Othmer Encyclopedia of Chemical Technology*, Third Edition, John Wiley & Sons, New York (1981), Volume 16, pages 453-469, the entire contents of which are incorporated by reference.

Random copolymers of propylene and ethylene are also well-known and commercially available. Random copolymers are generally made by adding a minor percentage of ethylene, usually about 0.1 to about 7.0 weight percent, into the polypropylene polymerization reactor. The effect of random copolymerization on polymer properties is exhibited by differences in polymer crystallinity, melting point (Tm), glass transition temperature (Tg), and the solubility between a copolymer and the corresponding homopolymers. In addition to the above cited Kirk-Othmer reference, additional details concerning random copolymers and their preparation may be found in D. N. Schulz and D. P. Tate, "Copolymers," *Kirk-Othmer Encyclopedia of Chemical Technology*, Third Edition, John Wiley & Sons, New York (1979), Volume 6, pages 798-818, the entire contents of which are hereby incorporated by reference.

As mentioned, problems associated with thermoforming polypropylene films and sheets stem from its characteristically low melt strength. Although higher cost, higher melt strength resins have been developed for thermoforming applications, the present invention provides a process for producing thermoformable polypropylene wherein low cost, conventional homopolymers and random copolymers can be utilized. It is within the scope of the present invention to utilize film and sheet produced from the process disclosed herein from such higher melt strength resins, to the extent that they are benefited.

The polyolefin resins used herein may be incorporated with antistatic agents, antioxidants, ultraviolet light absorbers and other ordinary additives without adverse effects. They may also be incorporated with nucleating agents.

The process of the present invention seeks to solve the problem of sag during thermoforming by providing a partially oriented film or sheet designed to shrink to correspond with the tendency to sag encountered in conventional thermoforming. This controlled shrinkage of the film or sheet thus will present a taut surface to the mold being used in thermoforming. Further, it has now been discovered that, when using the particularly preferred random copolymers of propylene and ethylene, the shrinkage tends to increase as the ethylene content increases, thus, providing for the first time, the ability to produce films and sheets having a controlled level of shrinkage during thermoforming.

U.S. Pat. No. 4,256,687 discloses the use of monoaxially or biaxially oriented polyolefin resin sheets to reduce sagging during thermoforming and teaches that if such sheets have been rolled under certain, highly specific rolling conditions, for example, in a low rolling ratio of 1.1 to 2.0, at a temperature lower than the melting point of the resin sheet, then the rolled resin sheet will exhibit substantially less sagging during the production of the molded containers described therein. This patent teaches away from the use of drawing or stretching techniques to provide orientation.

Polypropylene films and sheets for use in the present invention may be produced using any of the well-known processes such as roll-casting, blown film extrusion and calendering. Details of these processes are provided by Z. Tadmor and C. G. Gogos in *Principles of Polymer Processing*, John Wiley & Sons, New York, 1979, Chapter 1, pages 7-11, Chapter 14, pages 624-631, Chapter 15, pages 637-641 and Chapter 16, pages 661-668, the entire contents of which are incorporated by reference in their entirety. The roll-casting process is preferred in the practice of the present invention.

Molecular orientation may be imparted by the well-known tentering or roll stretching processes for flat films and sheets produced by roll-casting or calendering, or by the bubble or tubular process, for films produced by blown-film extrusion. Within these two general categories, a great variety of acceptable mechanical devices exist, as those skilled in the art will readily understand.

In the bubble process, a tube is extruded at about 200° C., rapidly quenched to about 0° to 20° C., then reheated to about 100° to 150° C. by cylindrical radiant heaters and expanded about two to ten times circumferentially under air pressure while being axially accelerated about two to ten times by the take-away nip rolls. Film so made is heat shrinkable at 100° to 150° C. and can typically shrink up to 40 to 50% at 120° C. A heat-stabilized film with a shrinkage of less that 3 to 5% at 120° C. can be obtained by reinflating the flattened bubble, under lower air pressure, and passing it through tubular heating elements which heat the film for a few seconds to a temperature close to its melting point, i.e., 160° C., then collapsing the tube.

In the tentering process, a film or sheet, which may already be uniaxially oriented in the machine direction (MD) as a result of its forming process, is provided with transverse direction (TD) orientation by attaching edge clips to the film or sheet progressively and stretching the film perpendicular to its machine direction travel. The tentering process is described in more detail by W. R. R. Park and J. Conrad in "Biaxial Orientation," *Extrusion and Other Plastics Operations*, John Wiley & Sons, 1971, pages 103–135, incorporated herein by reference.

A method of determining molecular orientation is described in the *The Journal of Polymer Science*, Volume XLVII, pages 289–306 (1960), in an article entitled "X-Ray Determination of the Crystallite Orientation Distribution of Polyethylene Terephthalate Films," by C. J. Heffelfinger and R. L. Burton; and "Structure and Properties of Oriented Poly(ethylene Terephthalate) Films," by Heffelfinger and Schmidt in the *Journal of Applied Polymer Science*, Volume 9, page 2661 (1965).

The following examples demonstrate the extent of the unexpected results obtained by the process of present invention. The invention is illustrated by the following non-limiting examples.

EXAMPLES 1–13

These examples describe the production of partially oriented polypropylene films having nominal gauge thicknesses of 2.0 to 5.3 mils, the resultant properties obtained when gauge, resin type and orientation are varied and the relative thermoformability of each film.

The aforementioned roll-casting film extrusion process was utilized for all films. The film extrusion line was made up of a standard extruder screw, barrel, die, take-off and wind-up equipment. A die gap of 0.080 inches was used for all seven films produced. Quench temperature was maintained within a range of 80° to 110° F., which satisfied the need to maintain uniform temperature at the MD stretch zone. Each film was stretched using a tenter stretching device of the type previously described.

Three types of polypropylene resins were used: (1) a homopolymer; (2) a random copolymer containing 1% ethylene comonomer and; (3) a random copolymer containing 3.5% ethylene comonomer. The homopolymer and the 3.5% ethylene random copolymer were obtained from the Fina Oil and Chemical Company of Dallas, Tex. and the 1% ethylene random copolymer was obtained from the Shell Chemical Company of Houston, Tex.

Properties of the films so produced are shown below in Table 1:

TABLE 1

| | | POLYPROPYLENE FILM PROPERTIES 2.0 to 5.3 mil Gauge | | | | | | |
|---|---|---|---|---|---|---|---|---|
| | | NOMINAL GAUGE | ORIENTATION | | PERCENT SHRINKAGE AT | | | |
| | | | | | 225° F. | | 275° F. | |
| EX. | RESIN | (MIL) | MDX (NOM.) | TDX (NOM.) | MD | TD | MD | TD |
| 1 | Homopolymer[1] | 3.0 | 4.0 | 7.1 | −0.7 | −1.7 | −1.7 | −1.7 |
| 2 | Homopolymer[1] | 3.6 | 4.7 | 6.3 | −0.9 | −0.2 | −1.6 | −1.1 |
| 3 | 1% Ethylene[2] Random Copolymer | 4.0 | 4.7 | 7.0 | −1.3 | +0.1 | −3.6 | −1.2 |
| 4 | 1% Ethylene[2] Random Copolymer | 5.3 | 4.7 | 7.0 | −1.0 | +0.4 | −3.8 | +0.3 |
| 5 | 3.5% Ethylene[3] Random Copolymer | 2.0 | 5.0 | 8.0 | −7.3 | −12.8 | −36.0 | −49.3 |
| 6 | 3.5% Ethylene[3] Random Copolymer | 3.0 | 4.1 | 7.5 | −6.0 | −10.0 | −30.5 | −48.3 |
| 7 | 3.5% Ethylene[3] Random Copolymer | 4.0 | 4.0 | 7.1 | −5.3 | −9.7 | −23.0 | −43.5 |

[1]Fina W-472 Propylene Homopolymer
[2]Shell WRS-6 1% Ethylene Random Copolymer
[3]Fina W-756 3.5% Ethylene Random Copolymer As indicated, it is generally the case that, as the ethylene content is increased, holding gauge thickness, machine direction orientation (MDX) and transverse direction orientation (TDX) approximately constant, percent shrinkage increases. Thus, when thermoforming sag is a particular problem, a random copolymer of higher ethylene content, which would provide a higher degree of shrinkage could be advantageously utilized.

Likewise, the above data demonstrate that as orientation is increased in a particular direction, percent shrinkage in that direction will generally also increase. This provides a similar benefit when thermoforming such films and, when combined with a change in ethylene content, permits the production of a film tailored to the particular article to be thermoformed and its physical requirements.

A selection of the above-described films were evaluated for thermoformability. A Comet Thermoformer and a female forming die were used. The cavity was six inches long and four inches wide with a ⅛ inch corner and bottom radius. The die was designed so that the depth could be changed with the use of ¼ inch spacers. A seven inch by five inch top clamp ring was used to hold the film. Key thermoforming process steps were as follows:

1. A 26"×20" film sample was put into a retaining frame.
2. The frame would retract into an oven of calrod heaters.

3. After a set dwell time in the oven, the frame would retract out of the oven.
4. The bottom die would then move up and the clamp ring down, sandwiching the film between them.
5. The vacuum would then be engaged, drawing the film down into the female die.
6. After the film had cooled (with vacuum holding the film in the die), the vacuum was released.
7. The clamping ring and die would retract.
8. The film was then removed from the retaining frame.

Results of the thermoforming evaluations are shown in Table 2.

TABLE 2

THERMOFORMING EVALUATION
COMET VACUUM THERMOFORMER

| EXAMPLE | FILM OF EXAMPLE NUMBER | MOLD DEPTH (INCHES) | COMMENTS |
| --- | --- | --- | --- |
| 8 | 2 | 0.5 | Satisfactory performance |
| 9 | 2 | 1.0 | Could not thermoform without mold modifications |
| 10 | 5 | 1.0 | Excellent performance |
| 11 | 5 | 1.0 | Excellent performance |
| 12 | 7 | 0.5 | Excellent performance |
| 13 | 7 | 1.0 | Excellent performance |

As shown, the 2 and 4 mil copolymer film thermoformed very well. Thermoforming the 3.5 mil homopolymer film was no problem in the ½ inch mold but required more heat and larger mold air holes to get the film to draw into the mold. Although some modifications to the molds were made during these trials, problems were experienced at the 1.0 inch mold depth for the homopolymer film in that it could not be drawn completely into the mold. The superior performance obtained in Examples 10 through 13 is attributed to the enhanced shrinkage properties of the 3.5% ethylene random copolymer film.

EXAMPLES 14–22

These examples relate to partially oriented polypropylene films having gauge thickness of 5.0 to 10 mils. Films were produced in the manner described for Examples 1 to 7, with the exception that the die gap used in the roll-casting process was increased to 0.100 inches to avoid film "curtaining". These heavier gauge films could only be produced from the random copolymer resins. It is believed that the inherent stretchability of the copolymeric resins facilitated the production of films in excess of 5 mils.

Two types of random copolymers were used: (1) 1.5% ethylene content copolymer, obtained from the Shell Chemical Company of Houston, Tex. and; (2) a 3.5% ethylene content copolymer, obtained from the Fina Oil and Chemical Company of Dallas, Tex.

Properties of the films produced are presented in Table 3.

TABLE 3

POLYPROPYLENE FILM PROPERTIES
5.0 TO 10.0 MIL GAUGE

| EXAMPLE | RESIN | NOMINAL GAUGE (MILS) | ORIENTATION MDX (NOMINAL) | TDX (NOMINAL) |
| --- | --- | --- | --- | --- |
| 14 | 1.5% Ethylene[1] Random Copolymer | 5.0 | 4.0 | 4.5 |
| 15 | 1.5% Ethylene[1] Random Copolymer | 7.5 | 3.5 | 6.9 |
| 16 | 1.5% Ethylene[1] Random Copolymer | 8.0 | 3.5 | 6.0 |
| 17 | 1.5% Ethylene[1] Random Copolymer | 8.5 | 3.5 | 6.3 |
| 18 | 1.5% Ethylene[1] Random Copolymer | 10.0 | 4.0 | 4.5 |
| 19 | 3.5% Ethylene[2] Random Copolymer | 5.0 | 4.0 | 8.0 |
| 20 | 3.5% Ethylene[2] Random Copolymer | 7.5 | 1.0 | 7.3 |
| 21 | 3.5% Ethylene[2] Random Copolymer | 9.0 | 3.0 | 5.8 |
| 22 | 3.5% Ethylene[2] Random Copolymer | 9.5 | 1.1 | 7.4 |

[1]Shell WRS 6-147, 1.5% Ethylene Random Copolymer
[2]Fina W-756, 3.5% Ethylene Random Copolymer Samples of these films were then subjected to the thermoforming process previously described. All materials were found to thermoform well. It was generally observed with these films that, as soon as the films were heated to the forming temperature and started to sag, they would shrink to a tight web and go into the mold very uniformly for thermoforming.

A variety of commercial-type articles were also thermoformed. These included a one-inch deep rice tray, a three-ounce circular bowl and a hamburger container having a "clam shell" configuration. As with all articles produced, excellent optical clarity was obtained. These consumer articles also exhibited excellent properties during exposure to microwave heating and could handle even boiling chili.

EXAMPLES 23–25

These examples demonstrate that thermoformable partially oriented polypropylene can be produced in gauge thicknesses of 10 to 22 mils. Sheets were produced as described for the films of Examples 1 to 7, with the exception that the die gap used was increased to 0.115 inches to accomodate the greater thicknesses. The same random copolymer resins used in Examples 14 to 22 were used to form these films.

Properties of the films produced are presented below in Table 4.

TABLE 4

POLYPROPYLENE FILM PROPERTIES
10 TO 22 MIL GAUGE

| EXAMPLE | RESIN | NOMINAL GAUGE (MILS) | ORIENTATION MDX (NOMINAL) | TDX (NOMINAL) |
| --- | --- | --- | --- | --- |
| 23 | 1.5% Ethylene Random Copolymer[1] | 15 | 1.2 | 5.0 |
| 24 | 3.5% Ethylene Random | 13 | 3.0 | 5.0 |

TABLE 4-continued

POLYPROPYLENE FILM PROPERTIES 10 TO 22 MIL GAUGE

| EX-AMPLE | RESIN | NOMINAL GAUGE (MILS) | ORIENTATION MDX (NOMINAL) | ORIENTATION TDX (NOMINAL) |
|---|---|---|---|---|
| 25 | Copolymer[2] 3.5% Ethylene Random Compolymer[2] | 22 | 1.2 | 5.0 |

[1]Shell WRS 6-147, 1.5% Ethylene Random Copolymer
[2]Fina W-756, 3.5% Ethylene Random Copolymer These sheets were also subjected to the identical thermoforming process described above. All sheets were found to thermoform well. Again, the intricatly-shaped consumer articles produced from the films of Examples 14 to 22 were thermoformed from the sheets of Examples 23 to 25 with excellent results achieved. Good optical properties were again exhibited.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A process for producing a polyolefin sheet for thermoforming with minimal sag, comprising the steps of:
   (a) providing a polyolefin sheet, said sheet produced from a resin selected from the group consisting of random copolymers of propylene monomer and ethylene monomer and mixtures of homopolymers of propylene and random copolymers of propylene monomer and ethylene monomer; and
   (b) stretching said sheet in at least one direction to obtain a partial orientation of a degree effective to minimize sag when thermoforming said sheet;
wherein said ethylene monomer of said random copolymer is present in an amount effective to minimize sag when thermoforming said sheet.

2. The process of claim 1, wherein in step (a), said random copolymer comprises about 0.1 to about 10 percent by weight of ethylene monomer and about 90 to about 99.9 percent propylene monomer.

3. The process of claim 2, wherein in step (a), said ethylene monomer is present in an amount between about 0.1 to 7.0 percent.

4. The process of claim 3, wherein in step (a), said ethylene monomer is present in an amount between about 1.0 to 3.5 percent.

5. Partially oriented polyolefin produced in accordance with claim 4 in a thermoformed shape.

6. A method of thermoforming a partially oriented polyolefin sheet, comprising the steps of:
   (a) providing a partially oriented polyolefin sheet said sheet produced from a resin selected from the group consisting of random copolymers of propylene monomer and ethylene monomer and mixtures of homopolymers of propylene monomer and random copolymers of propylene monomer and ethylene monomer, said sheet oriented to a degree effective to minimize sag while conducting steps (b) through (d);
   (b) subjecting said sheet to a temperature sufficient to permit deformation thereof;
   (c) deforming the so-treated sheet to a predetermined shape; and
   (d) while so-deformed cooling the same to cause retention of said shape.

7. The process of claim 6, wherein in step (a), said random copolymer comprises about 0.1 to about 10 percent by weight of ethylene monomer and about 90 to about 99.9 percent propylene monomer.

8. The process of claim 7, wherein in step (a), said ethylene monomer is present in an amount which is selected to minimize sag when thermoforming said film or sheet.

9. The process of claim 8, wherein in step (a), said ethylene monomer is present in an amount between about 0.1 to about 7.0 percent.

10. The process of claim 9, wherein in step (a), said ethylene monomer is present in an amount between about 1.0 to about 3.5 percent.

11. The process of claim 10, wherein in step (b), the sheet is deformed by sub-atmospheric pressure exerted on one side thereof.

12. The process of claim 11, wherein in step (b), the deformation is assisted by a mechanical plug.

13. The process of claim 12, wherein in step (b), the deformation is further assisted by above-atmospheric pressure exerted on one side thereof.

14. A process for producing a thermoformable polyolefin film, comprising the steps of:
   (a) providing a polyolefin film, said film produced from a resin selected from the group consisting of random copolymers of propylene monomer and ethylene monomer and mixtures of homopolymers of propylene and random copolymers of propylene monomer and ethylene monomer; and
   (b) stretching said film in at least one direction to obtain a partial orientation of a degree effective to minimize sag when thermoforming said film;
wherein said ethylene monomer is present in an amount effective to minimize sag when thermoforming said sheet.

15. The process of claim 14, wherein in step (a), said random copolymer comprises about 0.1 to 10 percent by weight of ethylene monomer and about 90 to 99.9 percent propylene monomer.

16. The process of claim 15, wherein in step (a), said ethylene monomer is present in an amount between about 0.1 to 7.0 percent.

17. A method of thermoforming a partially oriented polyolefin film comprising the steps of:
   (a) providing a partially oriented polyolefin film said film produced from a resin selected from the group consisting of random copolymers of propylene monomer and ethylene monomer and mixtures of homopolymers of propylene and random copolymers of propylene monomer and ethylene monomer, said film oriented to a degree effective to minimize sag while conducting steps (b) through (d);
   (b) subjecting said film to a temperature sufficient to permit deformation thereof;
   (c) deforming the so-treated film to a predetermined shape; and
   (d) while so-deformed cooling the same to cause retention of said shape.

18. The process of claim 17, wherein in step (a), said random copolymer comprises about 0.1 to 10 percent by weight of ethylene monomer and about 90 to 99.9 percent propylene monomer.

19. The process of claim 18, wherein in step (a), said ethylene monomer is present in an amount which is selected to minimize film sag when thermoforming said film.

* * * * *